April 2, 1957 W. G. VOGEL 2,787,058
SWINGING CUTTER FOR WEEDS AND THE LIKE
Filed Oct. 15, 1954

INVENTOR
William G. Vogel
BY
Frank E. Liverance, Jr.
ATTORNEY

United States Patent Office 2,787,058
Patented Apr. 2, 1957

2,787,058

SWINGING CUTTER FOR WEEDS AND THE LIKE

William G. Vogel, Grand Rapids, Mich.

Application October 15, 1954, Serial No. 462,452

4 Claims. (Cl. 30—318)

This invention is directed to a novel, efficient and practical swinging cutter for weeds and the like of the type which is swung by the operator thereof holding it in his hands, the cutter depending therefrom and reaching substantially to the ground surface, and a cutting blade sharp at both side edges moved back and forth, the blade lying substantially parallel to the surface over which it is moved.

With my invention the blade is readily removed and replaced when it is to be sharpened or otherwise serviced, or when it needs replacement by a new blade. The blade is mounted on the upper side of a carrier therefor which insures that no edge of the blade will contact with the ground and be dulled or otherwise damaged. The shaft which carries a handle member at its outer end is detachably connected with such blade carrier and the blade itself in a novel and effective manner. The blade is very firmly and securely connected to its carrier and at its outer end is not only covered and maintained against damage but is held securely against movement by abutting engagement against a shoulder of the carrier. In addition, with my invention the blade and its carrier are substantially balanced with respect to the handle shaft which is formed at its lower end with a form to provide for such balance.

It is an object and purpose of the present invention to provide a cutter for weeds and the like having the desired functions and properties above stated, which is economical to produce, easily assembled and is of long life and dependable, the blade edges not becoming dulled and damaged by engagement with the earth, stones or the like.

An understanding of the invention may be had from the following description, taken in connection with the accompanying drawing, in which, Fig. 1 is an elevation of the swinging weed cutter of my invention.

Like reference characters refer to like parts in the different figures of the drawing.

The shaft 1 is an elongated rod or may be a tube, preferably, which at its outer end has a handle 2 securely connected therewith. At its lower end portion such shaft is bent at right angles to provide a short section 3 which is return bent in a bend at 4 terminating in a flattened lower end section 5, the plane of which is at an acute angle to the length of the shaft 1.

Figure 4:
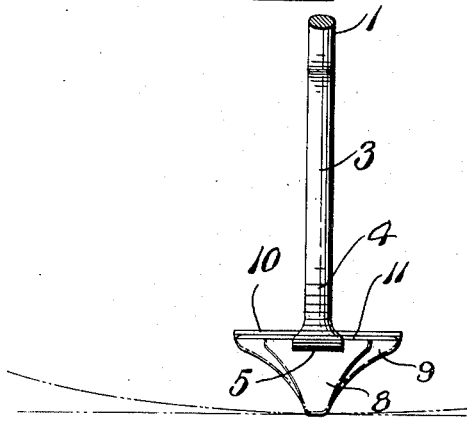
Fig. 4 is an end elevation taken substantially from the plane of line IV—IV of Fig. 2, looking in the direction indicated.

A blade holder is provided having an upper flat surface 6 and may be of cast metal. At its upper side and one end portion it has a shallow elongated recess 7 therein of a length and depth such that the flattened section 5 of the shaft is received therein with its upper side substantially flush with the upper side 6 of the blade carrier. Such carrier, as shown in end elevation in Fig. 4, is widest at its upper side and is progressively reduced in thickness downwardly making a body 8 of a generally triangular form in cross section, the lower part of which is relatively narrow in width compared to the upper portion. At the end farthest away from the recess 7 the body 8 of such carrier is flared outwardly to be of a greater width at its upper side as indicated at 9 and is provided with an inner, transverse vertical shoulder 10, as shown.

The cutter blade 11 of thin suitable material such as a good quality of steel has a length equal to the length of the blade carrier body 8 from the end where the shaft is attached to the shoulder 10. The outer end of the blade 11 may be brought against such shoulder. The width of the blade is equal substantially to the width of the end 9 at which such shoulder 10 is located, being wider than the upper surface 6.

Figure 1:
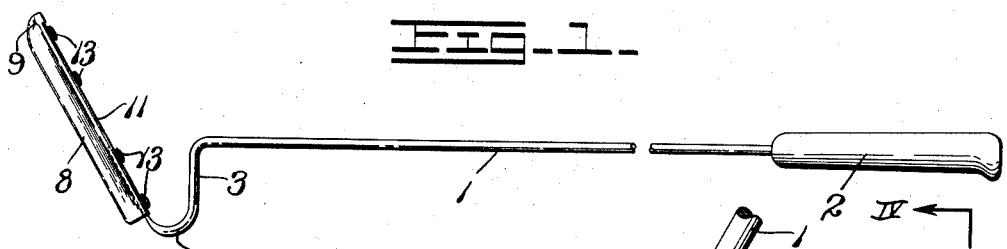
Figure 2:
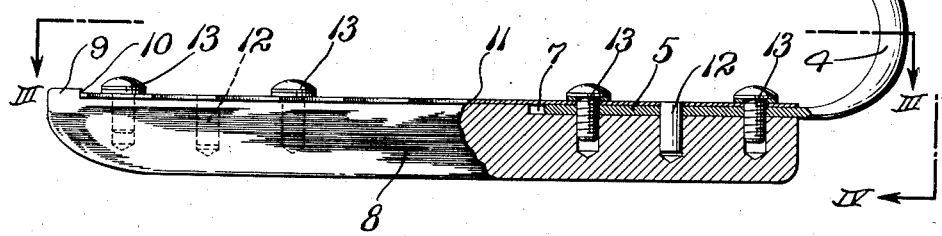
Fig. 2 is an enlarged elevation of the lower end portion of the blade cutter, a part of the blade carrier being broken away and shown in section for better disclosure.
Figure 3:
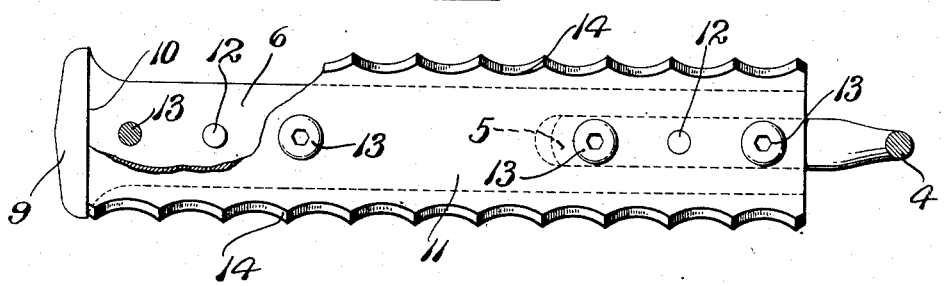
Fig. 3 is a plan view of the cutting blade and its carrier, the view being taken from the plane of line III—III of Fig. 2, looking in the direction indicated.

Two dowel pins 12, one adjacent each end of the body 8 of the blade carrier, are fixedly secured thereto and extend upwardly a sufficient distance that at their upper ends when the flattened section 5 of the shaft is located in the recess 7 and the blade 11 placed thereover (Fig. 2) the upper ends of both dowels 12 are flush with the upper surface of the blade, serving to properly locate it. The blade is secured in place by screws 13 one at each side spaced from each dowel 12 which are threaded into the body 8 of the carrier, passing through the blade and also through the flattened section 5 of the shaft 1 as shown in Fig. 2.

Figure 5:
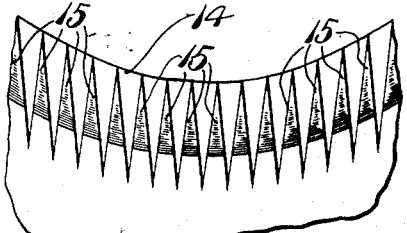
Fig. 5 is an enlarged plan view of one of the cutting scallops of the blade, a plurality of which are at each edge thereof.

The blade at each side edge has a plurality of successive scallops 14 which are inclined downwardly and outwardly to make sharp outer edges, the edge portions of the blade extending outwardly beyond the sides of the upper surface 6 of the carrier body 8. Preferably, each scallop includes a plurality of closely located successive triangular upwardly extending projections 15 separated by triangular recesses as shown in Fig. 5, such raised portions 15 progressively increasing in depth from the sharpened edges of the blade inwardly to the inner sides of the scallops 14. Such structure of blade scallops is one which is particularly effective in severing weeds or the like when the device is swung back and forth in the usual manner of operation of devices of this character.

In Fig. 4, the surface of the ground being indicated by a horizontal dot and dash line, the path of movement of the lower side of the body 8 of the blade carrier is shown in an arcuate dot and dash line above the ground surface. It is apparent that the blade edges are at all times above the surface of the ground and there is no damaging engagement of the cutting edges of the blade or any portion of the blade with the ground during any of the swinging movements of such cutter. The assembly of the parts is easy. The removal of the blade by merely withdrawing the screws 13 is expeditiously accomplished and a replacement of the blade and reattachment thereof is simple and easy. The longitudinal axis of the shaft 1 extended at its lower end reaches the blade and its carrier between the ends thereof providing a better balance than would otherwise be obtained. The structure is one which has been thoroughly tested and tried and is exceptionally satisfactory.

The invention is defined in the appended claims and is to be considered comprehensive of all forms of structure coming within their scope.

I claim:

1. A weed cutter comprising, an elongated shaft having a flattened lower end portion, an elongated blade carrier having a body with a flat upper surface provided with a shallow, centrally located elongated recess in which the flattened end portion of said shaft is received, a flat blade having a cutting edge at a side edge thereof located against the upper flat surface of said blade carrier, and screws passing through an end portion of said blade and the flattened portion of the shaft, threading into the adjacent end portion of said blade carrier.

2. A blade carrier having the elements in combination defined in claim 1, said blade carrier at the free end portion thereof having a widened enlargement extending upwardly above said flat upper surface to provide a shoulder against which the adjacent end of said blade is substantially in contact engagement.

3. In a weed cutter, an elongated blade carrier having a flat, generally horizontal upper surface, a blade having a cutting edge outwardly beyond the adjacent side of said carrier located against said carrier and secured thereto, said carrier at one end portion having a centrally located shallow recess from said carrier end for a distance, said recess being covered by said blade, and a shaft having a flattened end portion seated in said recess in the carrier under the blade and secured to said carrier, said shaft extending beyond the adjacent end of the carrier, thence extending upwardly and back over the adjacent end portions of said carrier and blade, and thence upwardly at an acute angle to the vertical.

4. In a weed cutter, an elongated blade carrier, a blade having a cutting edge extending outwardly beyond the adjacent side of the carrier located against the upper side of the carrier and lengthwise thereof, means securing the blade to the carrier, a shaft having a lower end portion inserted between the under side of said blade and upper side of the carrier, at one end portion thereof, detachable means securing said lower end portion of the shaft and associated end portion of the blade and carrier together, said shaft extending outwardly beyond the adjacent end of said carrier and thence extending upwardly at an acute angle to the vertical.

References Cited in the file of this patent
UNITED STATES PATENTS

| | | |
|---|---|---|
| 652,602 | Earle | June 26, 1900 |
| 1,645,685 | Boig | Oct. 18, 1927 |
| 2,033,797 | Whitney | Mar. 10, 1936 |
| 2,151,577 | Withington | Mar. 21, 1939 |
| 2,431,106 | Brooke | Nov. 18, 1947 |